(12) United States Patent
Yamada

(10) Patent No.: US 7,628,029 B2
(45) Date of Patent: Dec. 8, 2009

(54) QUICK-FREEZING METHOD AND DEVICE FOR FOOD WITH LIQUID SURFACE CONTACT

(75) Inventor: Yoshio Yamada, Yokohama (JP)

(73) Assignee: Technican Company Ltd., Yokohama, Kanagawa Pref. (JP)

( * ) Notice: Subject to any disclaimer, the term of this patent is extended or adjusted under 35 U.S.C. 154(b) by 888 days.

(21) Appl. No.: 10/928,050

(22) Filed: Aug. 27, 2004

(65) Prior Publication Data

US 2005/0153041 A1  Jul. 14, 2005

(30) Foreign Application Priority Data

Jan. 9, 2004  (JP)  ............... 2004-004761

(51) Int. Cl.
*F25B 25/00* (2006.01)
(52) U.S. Cl. .......................................... 62/332; 62/465
(58) Field of Classification Search ................ 62/372, 62/467, 530, 60, 62, 457.2, 465; 426/524, 426/231
See application file for complete search history.

(56) References Cited

U.S. PATENT DOCUMENTS

| | | | | | |
|---|---|---|---|---|---|
| 1,775,549 | A | * | 9/1930 | Birdseye | 426/393 |
| 2,061,427 | A | * | 11/1936 | King | 62/438 |
| 2,254,406 | A | | 9/1941 | Zarotschenzeff | |
| 2,515,582 | A | * | 7/1950 | Beckwith et al. | 62/530 |
| 3,440,831 | A | * | 4/1969 | Thompson | 62/63 |
| 3,875,754 | A | * | 4/1975 | Faust et al. | 62/60 |
| 3,952,536 | A | * | 4/1976 | Faust et al. | 62/293 |
| 4,530,816 | A | * | 7/1985 | Douglas-Hamilton | 422/1 |
| 4,654,217 | A | * | 3/1987 | Nagoshi | 426/524 |
| 4,657,768 | A | * | 4/1987 | Nagoshi | 426/524 |
| 4,689,963 | A | * | 9/1987 | Sakai | 62/64 |

(Continued)

FOREIGN PATENT DOCUMENTS

EP  1134000  9/2001

(Continued)

OTHER PUBLICATIONS

Search Report for European Application No. 04021179 completed Apr. 4, 2005.

*Primary Examiner*—Mohammad M Ali
(74) *Attorney, Agent, or Firm*—Alston & Bird LLP

(57) ABSTRACT

A nonfreezing liquid is hermetically enclosed in one or more brine bags of a flexible plastic material. In the case using an existing refrigerator equipped with a freezer compartment, the brine bags are placed in a brine bag receiving vessel adapted to be located in the freezer compartment, and a cooling plate is provided at a location at the uppermost one of the brine bags. In freezing, food to be frozen is inserted between the cooling plate and the brine bags or between the brine bags so that at least the greater part of outer peripheries of the food is surrounded by a low temperature environment to substantially the same extent as immersion of the food in the nonfreezing liquid, thereby substantially realizing the liquid surface contact freezing. In the case of a newly fabricated refrigerator, the brine bags are directly placed in an exclusive freezer compartment and further cold air is forced against the cooling plate, thereby obtaining more complete frozen food. In this manner, according to the invention frozen food of high quality can be obtained for a very short period of time.

1 Claim, 4 Drawing Sheets

U.S. PATENT DOCUMENTS

| | | | |
|---|---|---|---|
| 4,715,195 A * | 12/1987 | Kucza | 62/376 |
| 5,520,010 A | 5/1996 | Altman | |
| 5,557,943 A | 9/1996 | Coelho et al. | |
| 6,471,402 B1 * | 10/2002 | Burns | 383/32 |
| 6,786,054 B2 * | 9/2004 | Voute et al. | 62/66 |

FOREIGN PATENT DOCUMENTS

| | | |
|---|---|---|
| GB | 662064 | 11/1951 |
| GB | 2284468 | 6/1995 |
| JP | 61081769 | 4/1986 |
| JP | 04-121178 | 4/1992 |
| JP | 2003042625 | 2/2003 |

\* cited by examiner

QUICK-FREEZING METHOD AND DEVICE FOR FOOD WITH LIQUID SURFACE CONTACT

BACKGROUND OF THE INVENTION

The present invention relates to a method and a device for quickly freezing whole food such as edible meat, edible marine products and fabricated food.

The applicant of the present application acquired a patent right of Japanese Patent No. 2,011,591 (Japanese Patent Application Publication No. H7-28,710(1995) invented by the inventor of the present application. As mentioned in the specification of the patented invention, with a refrigerator equipped with a freezer compartment popular with a usual family, the interior of the freezer compartment is in general kept at a temperature within a range of approximately −20° C. to −23° C. for storing frozen edible meat or marine products. The freezing may occur in the condition that the products are in contact with gaseous matter in the freezer compartment.

However, freezing of a product of a certain size, for example, a thickness of the order of 20 mm may take approximately 4 to 5 hours in order to cool the product until its center portion is also cooled to the temperature in the freezer compartment so that the water content of the edible meat components is separated from the meat cells and is then frozen. When the meat is defrosted or unfrozen, the frozen water would flow out together with the blood of the meat as drips, thereby considerably destroying the flavor of the meat, causing a problem.

In order to solve this problem in the above patented invention, food in a hermetically sealed package is mechanically lowered into a nonfreezing liquid cooled at a temperature lower than −30° C. so as to be immersed therein, and the nonfreezing liquid is cooled from its four peripheries and, in addition, agitated to maintain its cold condition uniformly so that the food is cooled from its all the peripheries to its interior to a freezing temperature of −30° C. to −60° C. so as to be frozen for a short period of time of the order of a few tens minutes.

Namely, this patented invention solved the problem that how the cooling temperature is caused to pass quickly through the temperature zone (−1° C. to −5° C.), in which the maximum amount of frozen product may be produced, to lower the temperature of the food such as edible meat or the like from its outer peripheries while keeping the liquid surface contact of high-thermal conductivity.

On the other hand, a quick-freezing method whose temperature is as low as lower than −70° C. has been proposed. With such a proposal, however, only surfaces of food would be quickly frozen to form a poor thermal conductive zone and thereafter the interior of the food may expand by freezing to cause cracks, resulting in an unfavorable result.

Under these circumstances, however, the freezing method with liquid surface contact of the patented invention described above tends to make its device bulky so that its application may be limited to freezing of a great amount of food for business purposes, and suffers a disadvantage from the difficulty to use for general families or small businesses.

SUMMARY OF THE INVENTION

It is an object of the invention to provide improved method and device which are able to freeze all kinds of food for a very short period of time without causing any drips, cracks and deterioration in flavor of food, and which are applicable to existing small or large type refrigerators for family or business use without any modification and are also applicable, of course, to refrigerators to be newly fabricated for effecting more complete freezing.

In order to achieve the object, the quick-freezing method for food with liquid surface contact according to the invention comprises using one or more brine bags made of a plastic material having a flexibility and a high-thermal conductivity in which a nonfreezing liquid called brine is hermetically enclosed, placing said one or more brine bags in a freezer compartment, arranging a cooling metal plate used as a heat radiation plate on the uppermost one of said one or more brine bags placed in said freezer compartment, and inserting and arranging food to be frozen between said cooling metal plate and said brine bags or between said brine bags so that at least the greater part of outer peripheries of the food to be frozen is surrounded by a low temperature environment to substantially the same extent as immersion of said food in the nonfreezing liquid, thereby quickly freezing said food at a rate at least several times the rate in gaseous matter contact freezing.

In another aspect of the invention, the electric refrigerator comprises a freezer compartment exclusive to quick freezing in an electric refrigerator for family or business use, the freezer compartment being kept therein at a temperature of −30° C. or lower; one or more brine bags; and a cooling metal plate movably provided at a location above the one or more brine bags, thereby enabling quick-freezing by liquid surface contact by arranging food to be frozen between the cooling metal plate and the brine bags or between the brine bags.

In a further aspect of the invention, the liquid surface contact type simple freezer comprises a brine bag receiving vessel having an outside dimension to be received in a freezer compartment of an existing electric refrigerator; one or more brine bags made of a material having a high-thermal conductivity and having hermetically enclosed freezing liquid therein; and a cooling plate, thereby freezing a product to be frozen inserted into between the brine bags or between the cooling plate and the brine bags by heat radiation cooling with liquid surface contact.

In the present invention, the idea of immersing a hermetically packed food in a freezing liquid in the patented invention is inverted or evolutionally changed into a new idea that food to be frozen is embraced between hermetically packed freezing liquid bags, or one surface of the food is substantially brought into liquid contact, and metal plate of a high-thermal conductivity is brought into abutment against the other surface of the food so that the food is frozen by the metal surface contact or liquid surface contact in a quick-freezing no less superior to the patented invention in an electric refrigerator equipped with an exclusive freezer compartment.

In realizing the idea of the present invention, the inventor has intended to make the new invention also applicable to very many refrigerators for family use or refrigerators of comparatively smaller type for business use.

For this purpose, the inventor has invented a liquid surface contact type simple freezer readily applicable to an existing refrigerator, and further invented a liquid surface contact type freezer compartment as a more complete freezer which is to be provided in a refrigerator to be newly fabricated.

In the present invention, the term "liquid surface contact" or "liquid surface contact freezing" used herein is intended to mean the freezing performed in a manner that food to be frozen is substantially completely covered with its outer peripheries by bring the food into contact with a cooling liquid through a plastic film or films or a cooling metal plate superior in quick-cooling to the cooling liquid.

According to the invention, on the basis of the idea described above, there is provided a container unit of a metal frame of a size to be arranged in a freezer compartment of an electric refrigerator already widely diffused, and arranged within the container unit are a plurality of durable bags of a plastic material such as vinyl chloride in which a nonfreezing liquid commonly called "brine" is hermetically sealed. A product to be frozen is inserted and embraced between the plurality of the brine enclosing bags cooled at a low temperature (approximately −20° C.) in the freezer compartment or between a cooling plate as a heat radiation plate also serving as a movable lid provided in the frame and the brine enclosing bags so that the product is frozen from all the outer peripheries by realizing the state of the liquid surface contact freezing in a manner substantially the same as the state of immersing the product in the liquid.

The effects of the first embodiment according to the invention will be explained herein. The freezer in the first embodiment of the invention can be simply located in a freezer compartment of a refrigerator generally widely used for home or business and makes it possible to produce frozen products in a simple manner in a general home or small shop using the principle of liquid surface contact freezing only by inserting food into between brine bags or between the cooling plate or heat radiation plate and the brine bags.

The present invention is particularly very effective in freezing a beef stake or the like, for example, having a thickness of the order of 10 to 30 mm. In the case of more than 30 mm thickness, it may be cooled by inserting it into between the brine bags.

Moreover, the freezer according to the invention is applicable not only to a refrigerator-freezer for a general family but also to a refrigerator-freezer for business in a restaurant or hotel. This freezing system can be carried out by setting the freezer according to the invention in a freezer compartment of a refrigerator-freezer for business or family. A small refrigerating machine (with a compressor) is usually used in the freezer compartment of a refrigerator for home or business so that its freezing ability would be very low, with the result that freezing would take much time and could not obtain frozen product superior in quality.

According to the system of the present invention, however, even a small amount of calorie is caused to thermally conduct by means of a liquid or metal plate to store the calorie so that a great freezing ability is obtained and the stored calorie is thermally conducted at once to a product to be frozen, thereby enabling the quick-freezing.

In a refrigerator for family use, the freezer compartment is at a temperature of approximately −20° C. to −22° C. so that it can merely store frozen products therein without performing freezing action, although it is called "freezer".

In the freezing system according to the invention, the freezing is quickly carried out by liquid surface contact freezing without depending upon an extremely lower temperature and in a manner different from the gas-freezing, that is, freezing by causing a product to contact cold gaseous matter so that the freezing system according to the invention can achieve a higher freezing ability even with a freezer compartment of a general refrigerator than in freezing using nitrogen gas at −100° C.

The effects of the second embodiment according to the invention will be explained herein. In the first embodiment of the invention, the simple freezers are arranged in a number of existing electric refrigerators, respectively, to make it possible to produce and store frozen food simply in families and the like. In the second embodiment of the invention, the refrigerator equipped with the freezer compartment for exclusive freezing makes it possible to perform more complete freezing.

According to the invention utilizing the cooling effect of the liquid surface contact freezing and preferably having a cooling fan, it is possible to freeze food very quickly at a rate about eight times that of the case of merely leaving food in the air at a low temperature. The principle of achieving such a superior freezing effect according to the invention may be understood from the fact that if one touches boiling water at about 100° C., he will be seriously burned, while one may not be burned in a sweating bath at 100° C.

It has been found from results of an experimentation that freezing of beef having a thickness of about 20 mm to 30 mm can be completed in a time approximately one-eighth of the time required for freezing the same beef in a gaseous matter according to the prior art freezing system. Namely, it has been ascertained that according to the freezing system of the invention meat and fish can be completely frozen for a short period of time which is approximately one-eighth of the time required for freezing them by a general cold gaseous matter, and the products frozen according to the invention do not produce any drips dribbling from the products when being defrosted or unfrozen.

The invention will be more fully understood by referring to the following detailed specification and claims taken in connection with the appended drawings.

DESCRIPTION OF PREFERRED EMBODIMENTS

Figure 1:
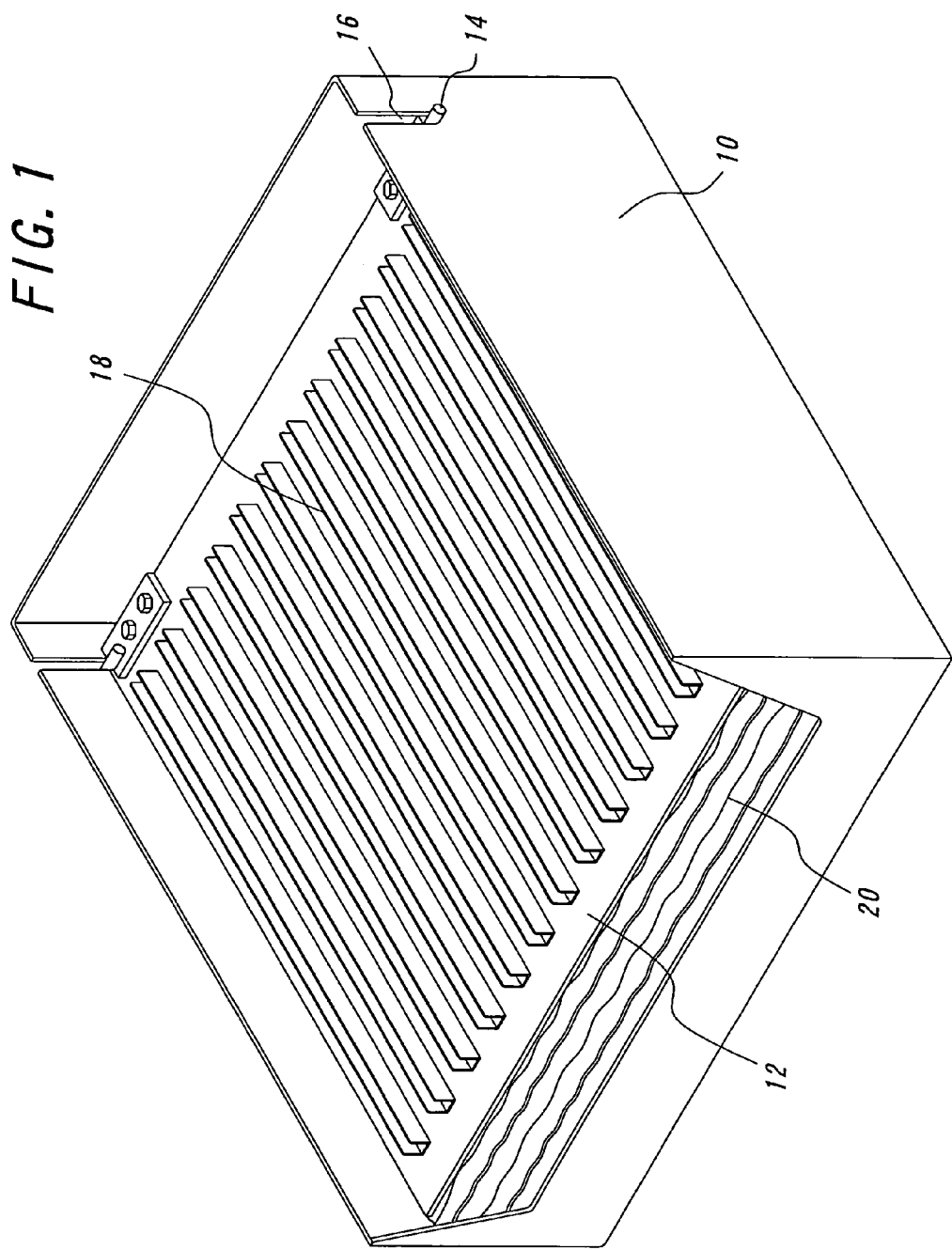
FIG. 1 is a perspective view illustrating one example of the simple freezer according to the first embodiment of the invention.

The first embodiment according to the invention will be explained with reference to the drawings. FIG. 1 is a perspective view illustrating one example of preproduction prototype of the simple freezer according to the invention. Although the invention is not limited to the size of the preproduction prototype, a brine bag receiving vessel 10 made of aluminum plates of a thickness of the order of 3 mm and having a square bottom plate of 25 cm×25 cm and a height of approximately 10 cm has been found to be accommodated in freezer compartments of most of refrigerators.

In the drawings, reference numeral 20 illustrates two to four stacked brine bags. Brine is a nonfreezing liquid, which is not frozen even at −30° C., of about 1 liter which is hermetically enclosed in a plastic bag of vinyl chloride or the like. Preferably, the bag used has a high-thermal conductivity and a sufficient strength.

In the drawings, reference numeral 12 denotes a cooling plate for radiating the heat positioned on or above the uppermost brine bag and provided on its upper surface with a number of fins 18 for improving heat radiation efficiency. The cooling plate 12 provided on its rear portion with hinges 14 adapted to engage in grooves 16 formed in the brine bag receiving vessel 10 for facilitating removal or opening or closing of the cooling plate 12.

Figure 2:
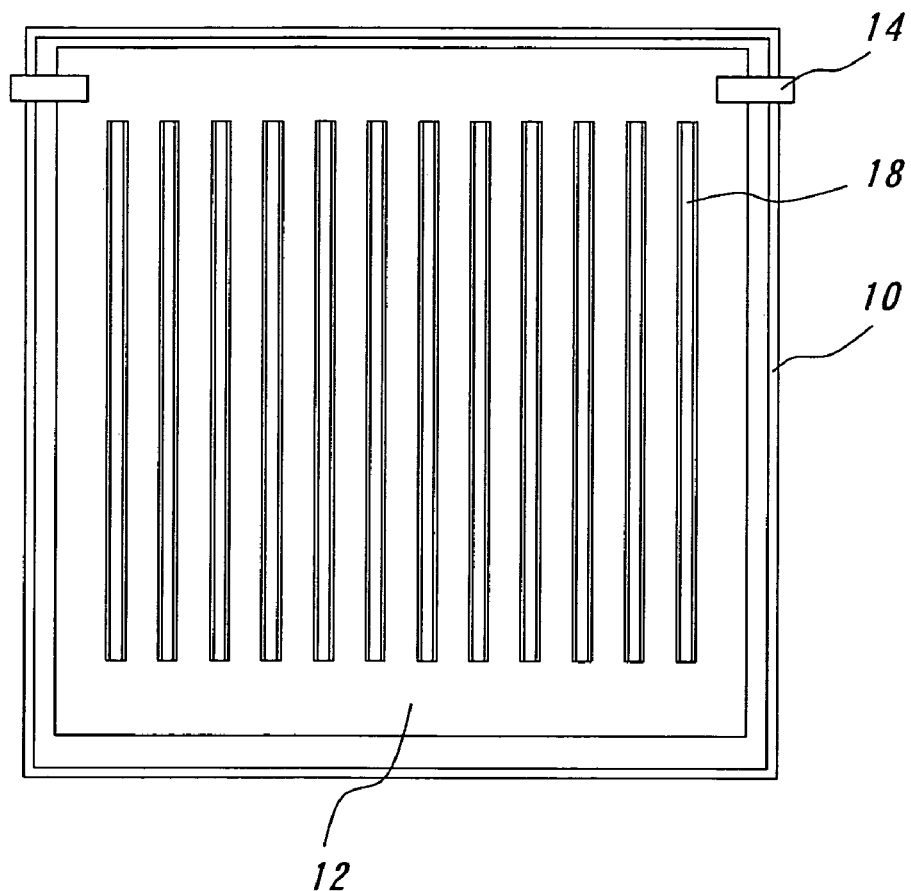
FIG. 2 is a plane view of the freezer shown in FIG. 1.
Figure 3:
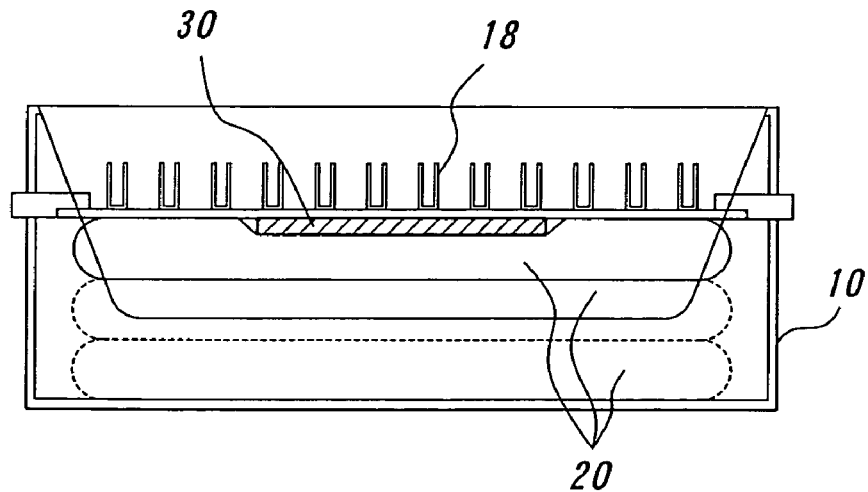
FIG. 3 is a front elevation of the freezer.
Figure 4:
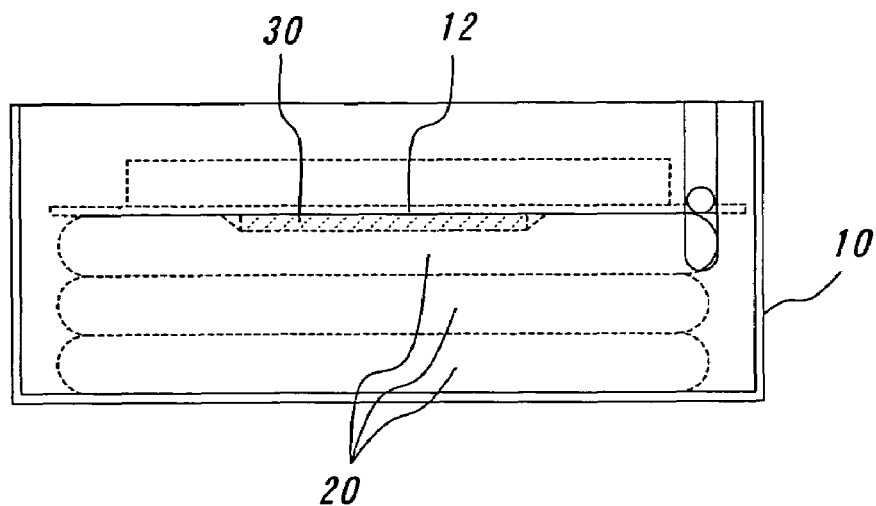
FIG. 4 is a partly sectional schematic side view of the freezer.

FIG. 2 is a plan view of the vessel 10, and FIGS. 3 and 4 are schematic views illustrating the state that a comparatively thin product 30 to be frozen is inserted between the cooling plate 12 and the brine bags 20.

As described above, the first embodiment of the invention is able to freeze all kinds of food for a very short period of time by realizing the liquid surface contact freezing in a very simple manner and is also advantageously applicable to existing usual refrigerators for family and business use.

The second embodiment of the invention will be explained hereinafter. According to the second embodiment, an exclusive freezer compartment is built in a new refrigerator so that the freedom of design is large. Essential features are that the freezing temperature is −30° C. or lower and that a fan is provided in the freezer compartment for blowing cooled air against a cooling plate. Other features are substantially similar to those described in the first embodiment.

Figure 5:
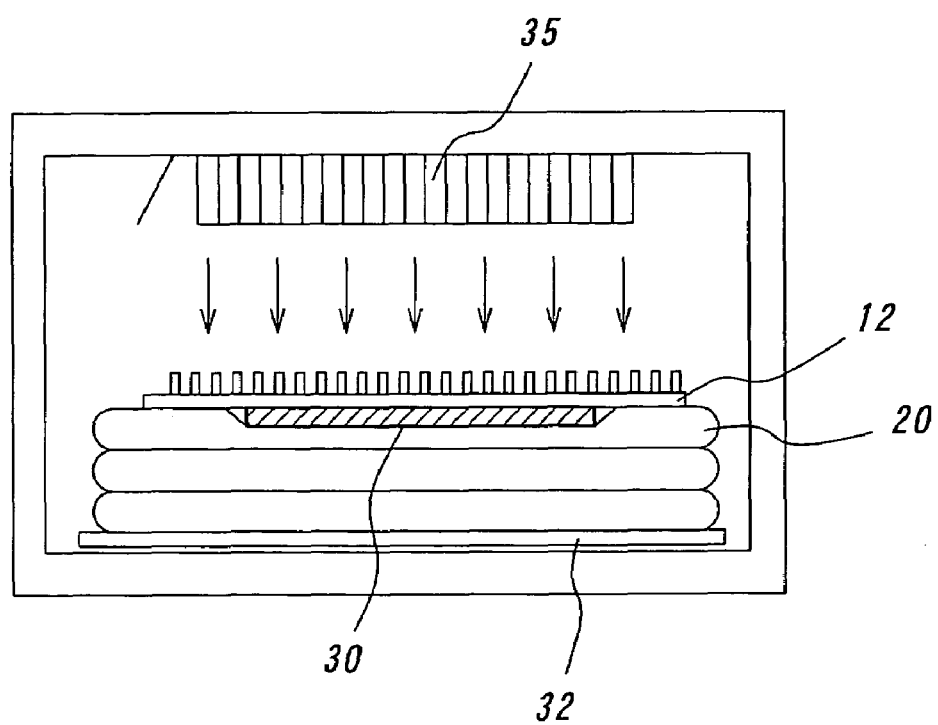
FIG. 5 is a schematic front elevation of a freezer compartment to be exclusively provided in a new electric refrigerator according to the second embodiment of the invention.
Figure 6:
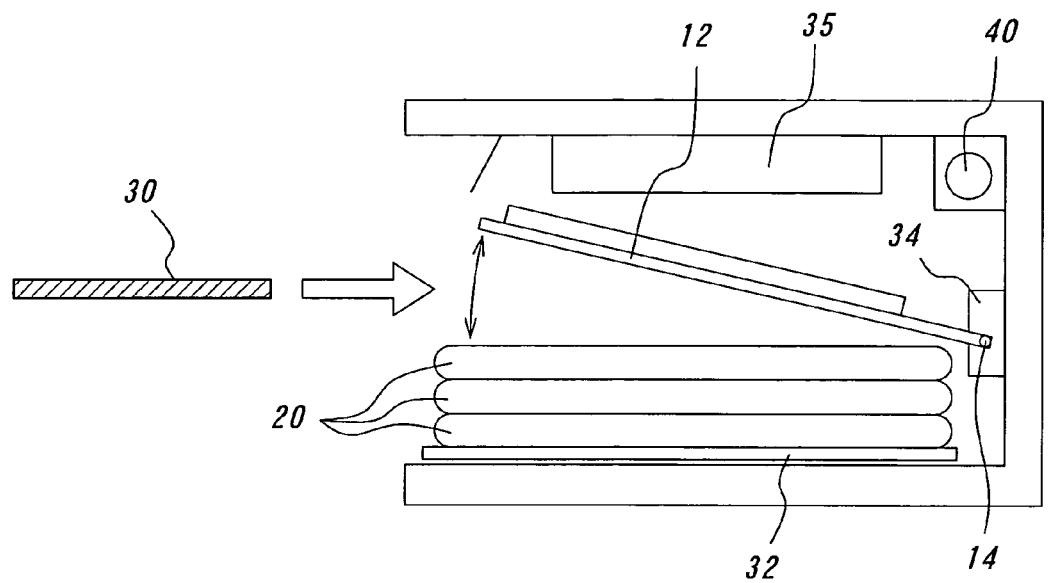
FIG. 6 is a schematic side view of the freezer compartment shown in FIG. 5 when a product to be frozen is being inserted thereinto.
Figure 7:
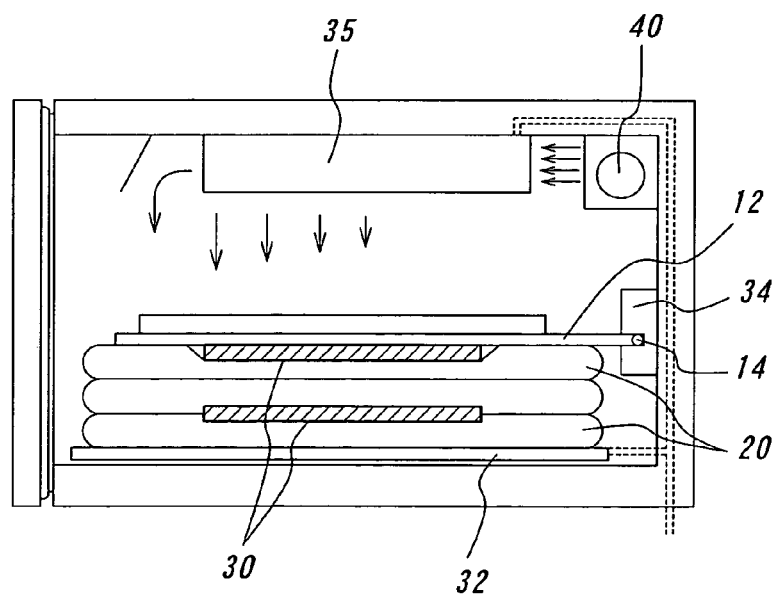
FIG. 7 is a schematic side view of the freezer compartment shown in FIG. 5 when the products are being frozen.

FIG. 5 is a front elevation of the freezer of the second embodiment and FIGS. 6 and 7 are side views illustrating only principal portions. In the second embodiment, brine bags are arranged directly in the freezer compartment so that the brine bag receiving vessel 10 as used in the first embodiment is not required. As shown in these drawings, therefore, the brine bags 20 are arranged on a lower flat cooling plate 32 located in a freezer compartment. An upper cooling plate 12 is arranged on the uppermost brine bag in the same manner as in the first embodiment. In this case, hinges 14 of the cooling plate 12 are directly pivotally secured to bases 34 mounted on the freezer compartment.

A subject feature of the second embodiment is to provide a fan 40 in the freezer compartment for agitating the cold air to send the cold air to a cooling coil 35 so that the cold air is blown against the upper cooling plate 12 to increase the freezing speed to a value several times the speed as it otherwise would have done.

The phenomenon of such a cooling effect may be well known from the fact that in mountain-climbing, one often does not feel cold particularly even at −30° C. in a windless state, but when strong wind is blowing, one may be exposed to a risk of being immediately frostbitten even at −20° C.

FIG. 6 is schematic view illustrating the state when food 30 to be frozen is being inserted into the freezer compartment with a fan for cold air being stopped, and FIG. 7 is a view showing the freezing state in which at initial freezing stage a cooling fan 40 sends cold air to a cooling coil 35 and toward a cooling plate 12. Arrows in the drawing illustrate the flow of cold air.

Preferably, the freezer compartment is so constructed that part thereof is able to be drawn out of the freezer compartment, thereby facilitating keeping the low temperature state.

As described above, the second embodiment of the invention is able to freeze food for a very short period of time by realizing the liquid surface contact freezing in a more effective and complete manner by providing an exclusive freezer compartment having a cooling fan in a refrigerator to be newly fabricated. It has been ascertained in one case that according to the second embodiment of the invention meat and fish can be frozen for a time which is approximately one-eighth of the time required for freezing them by a general cold gaseous matter.

While the invention has been particularly shown and described with reference to the preferred embodiments thereof, it will be understood by those skilled in the art that the foregoing and other changes in form and details can be made therein without departing from the spirit and scope of the invention.

What is claimed is:

1. A liquid surface contact type simple freezer comprising a brine bag receiving vessel having an outside dimension to be received in a freezer compartment of an existing electric refrigerator; one or more brine bags made of a material having a high-thermal conductivity and having hermetically enclosed freezing liquid therein; and a cooling plate, thereby freezing a product to be frozen inserted into between said brine bags or between said cooling plate and said brine bags by heat radiation cooling with liquid surface contact, wherein said cooling plate is provided with hinges which engage in grooves formed in said brine bag receiving vessel so that pivotal movement and removal of said cooling plate relative to and from said brine bag receiving vessel are possible, thereby facilitating the insertion of food to be frozen.

* * * * *

UNITED STATES PATENT AND TRADEMARK OFFICE
CERTIFICATE OF CORRECTION

PATENT NO.        : 7,628,029 B2                                    Page 1 of 1
APPLICATION NO. : 10/928050
DATED             : December 8, 2009
INVENTOR(S)       : Yoshio Yamada It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1503 days.

Signed and Sealed this

Second Day of November, 2010

David J. Kappos
*Director of the United States Patent and Trademark Office*